Dec. 19, 1950 W. E. HORTON 2,534,715
PHOTOELECTRIC WEB CONTROLLED SOUND REPRODUCER
Filed March 14, 1947 5 Sheets-Sheet 1

INVENTOR
William E. Horton
BY
ATTORNEY

Dec. 19, 1950 W. E. HORTON 2,534,715
PHOTOELECTRIC WEB CONTROLLED SOUND REPRODUCER
Filed March 14, 1947 5 Sheets-Sheet 4

INVENTOR
William E. Horton
BY
ATTORNEY

Dec. 19, 1950        W. E. HORTON        2,534,715

PHOTOELECTRIC WEB CONTROLLED SOUND REPRODUCER

Filed March 14, 1947        5 Sheets-Sheet 5

INVENTOR
William E. Horton
BY
ATTORNEY

Patented Dec. 19, 1950

2,534,715

UNITED STATES PATENT OFFICE 2,534,715

PHOTOELECTRIC WEB CONTROLLED SOUND REPRODUCER

William E. Horton, Highland Park, Calif., assignor to Lovaas Enterprises, Inc., Las Vegas, Nev., a corporation of Nevada Application March 14, 1947, Serial No. 734,627

21 Claims. (Cl. 179—100.3)

This invention relates to a photo-electric web controlled sound reproducer and it is a general object of the invention to provide a simple, effective, convenient and practical reproducer employing a web or strip type of record and which is useful in various situations where it is desired to reproduce sound.

My present application is filed as a continuation in part of my co-pending application entitled "Plural Selective Track Photoelectric Sound Reproducing Device" Serial No. 524,651, filed March 1, 1944, now abandoned, and this application is to take the place of my said copending application.

Sound has long been recorded on webs or filmlike strips or bodies and mechanisms have been proposed for using this type of record in situations other than the ordinary motion picture apparatus where sound is reproduced in synchronism with pictures. The mechanisms heretofore proposed or available for the handling of web records of sound have, for the most part, been complicated, expensive devices more or less difficult to operate and generally not satisfactory for ordinary or common use. Most devices of this character heretofore proposed have possessed undesirable characteristics either of structure or control, as they usually involve expensive or delicate mechanical devices and do not give the user the most advantageous control.

It is a general object of my present invention to provide a mechanism involving spools supporting a web bearing sound tracks running in opposite directions and involving a system of controls whereby the operator can easily, quickly and conveniently select the sound track desired, regardless of the direction in which the web may be operated. In carrying out my invention I prefer to provide a longitudinal web and I provide sound tracks in pairs extending longitudinally of the web each pair of sound tracks involving like recordings running in opposite directions on the web. Through the provision of such a web and with the controls that I have provided the operator can play the same recording regardless of which way the web is operated, the web being carried on spools and being operated back and forth between the spools, making the ordinary rewinding operation characteristic of most picture films, or the like, wholly unnecessary.

A further object of my present invention is to provide a mechanism of the general character referred to involving a simple, practical, dependable stop means whereby the apparatus is disengaged or stopped each time the web has been fully wound from one spool to the other.

A further object of the present invention is to provide apparatus of the general character referred to wherein there are several sets of sound tracks on the web and in which the mechanism involves but a single pick-up means or photoelectric cell coordinated with the various sound tracks.

It is another object of the invention to provide apparatus of the general character referred to wherein there is a single pick-up unit or photoelectric cell to be excited and a plurality of individually operable exciting means or light generating means. With the structure that I have provided there is an individual light source and light directing means for each sound track on the web. Through this feature of my invention I am able to eliminate entirely complicated gates and like mechanical features undesirable in mechanisms of this general character.

It is another object of the present invention to provide apparatus of the general character referred to wherein the record web is handled and supported in a most simple, effective, and practical manner. With my construction the web is carried on spaced spools to be wound back and forth between the spools maintaining a connecting part between the spools which part is free and unsupported and has a midpoint which is maintained in a substantially constant position throughout operation of the mechanism.

Another object of the invention is to provide a mechanism of the general character referred to wherein individual motors are provided to drive the web handling spools, the motors serving to both advance the spool and to establish drag so that the web is maintained in the desired taut condition on and between the spools. With my construction when one motor is operated to drive or operate the spool to which it is connected winding the web onto that spool, the other motor serves as a drag resisting operation of the other spool with consequent strain being maintained on the web as it operates from one spool to the other.

It is a further object of the present invention to provide a mechanism of the character referred to involving a minimum number of working or shiftable parts such as are generally found in mechanisms of this type. By my present invention I eliminate working parts except for those parts incidental to the support and operation of the web and those parts incidental to the switches of the electrical circuit. I gain a minimization of working parts largely through a simple practical arrangement and relationship of elements and by a utilization of electrical features, as will be hereinafter described.

It is another object to provide apparatus of the general character referred to suitable for general use by persons not skilled in the handling of delicate or technical apparatus. With the construction that I have provided there are no parts to become detached or separated in the normal use or handling of the apparatus. The normal operation of the structure is accomplished through simple control buttons and the record web is replaceable at will by merely opening the case in which it is located without detaching or removing the spools that carry the record.

A further and important object of my present invention is to provide apparatus of the general character referred to wherein the principal working parts may be located remote from the control elements or buttons required for operating the apparatus, making it practical to install and use the apparatus in various situations, such as in motor vehicles, in the home, in offices, etc.

It is a further object of the present invention to provide a unique simplified and improved control mechanism for a device of the character mentioned which mechanism involves a plurality of control buttons interconnected so that only one button can be engaged at a time.

The various objects and features of my invention will be fully understood from the following detailed description of typical preferred forms and applications of the invention, throughout which description reference is made to the accompanying drawings, in which:

The apparatus of the present invention in its complete form may be advantageously separated into three distinct units, a main unit X which carries the web and the web handling mechanism, the pick-up and the exciting means, a unit Y which carries the manually operable control parts and a unit Z which includes elements such as are usually incidental to mechanisms such as I provide in unit Y, that is, parts such as an amplifier, a speaker, etc. In the case illustrated in the drawings and shown, generally, in Fig. 1, the units X and Y are connected by means of what I will term a main cable A while the unit X is connected with the unit Z by a suitable cable B. It will be readily apparent that in practice the convenient and general use of the invention is expedited by the separation of the parts into units such as those described, in that this construction makes it possible to locate the control unit Y, which may be small compact unit, at a point convenient for operation, while the units X and Z which are working parts requiring little or no care or attention may be located where they are concealed from view of wherever space permits.

In the case of employing the invention on an ordinary automobile which is equipped with a conventional radio set, I need to supply only the units X and Y, since the amplifier and speaker of any conventional radio set may be employed in carrying out the invention. It is to be understood that my present invention is not concerned with the details of the unit Z or any of the elements thereof and therefore this unit is referred to only in a general way, whereas I will more specifically describe the features of units X and Y.

The elements that I have provided and which are incorporated primarily in the units X and Y include, generally, a record web C, web handling means D supporting the web for operation within a suitable case E, drive means F for the means D, pick-up means G preferably photoelectric means located within case E, exciting means H for generating beams of light, and directing them to the pick-up G, and preferably including a plurality of individually operated lamps, suitably coupled in a power circuit and separated into groups, group selecting means K for the lamps of means H, stop means L and various other elements and features of construction all of which will be more fully described.

Figure 4:
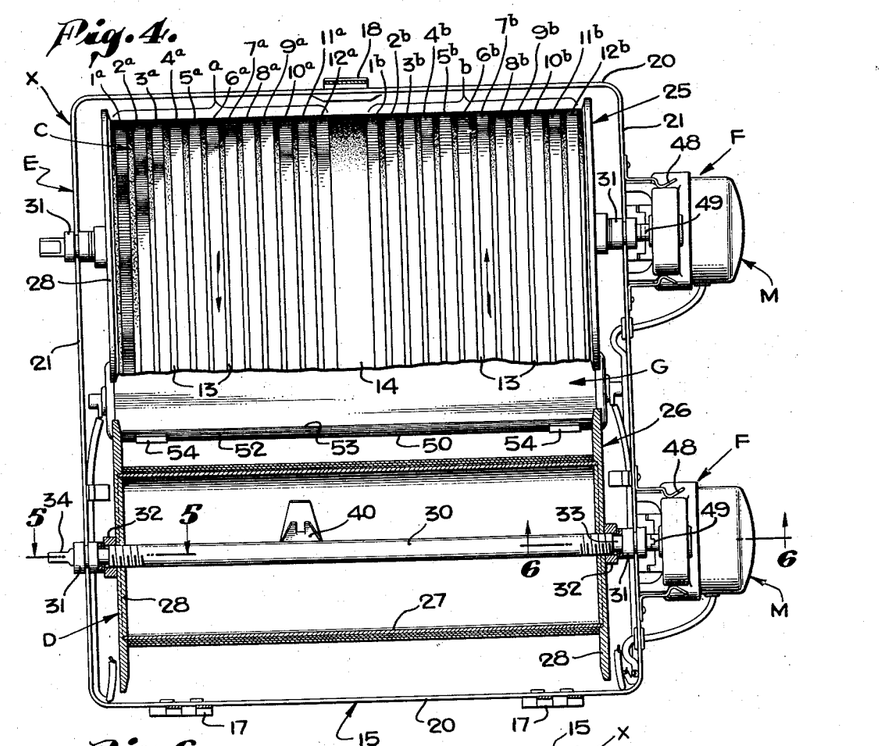
Fig. 4 is an enlarged sectional view taken substantially as indicated by line 4—4 on Fig. 3 showing the parts at the upper portion of the structure in elevation and those of the lower portion in section.

The record web C which is an important element of my invention is an elongate flexible strip or web preferably a film-like or film type of web suitable for being handled on reels or spools. I provide a plurality of recordings or sound tracks on the web C so that the sound tracks extend lengthwise of the web and in accordance with my invention the sound tracks are in pairs. Each pair of tracks involves one track running in one direction lengthwise of the web and the other running in the opposite direction lengthwise of the web, that is, I provide a plurality of sets or pairs of sound tracks on the web extending in both directions of the web. Further, in accordance with my invention I group the sound tracks on the web so that all of the tracks running in one direction on the web are grouped together or are in one group while all of the tracks running in another direction on the web are in another or separate group. In Fig. 4 of the drawings I show two groups a and b of sound tracks running lengthwise of the web C, the group a involving tracks running in one direction as indicated by the arrow on group a and the group b involving tracks running in the opposite direction, as indicated by the arrow on group b. In the particular case illustrated group a is shown as involving tracks $1^a$, $2^a$, $3^a$, $4^a$, $5^a$, $6^a$, $7^a$, $8^a$, $9^a$, $10^a$, $11^a$ and $12^a$ while group b is shown as involving tracks $1^b$, $2^b$, $3^b$, $4^b$, $5^b$, $6^b$, $7^b$, $8^b$, $9^b$, $10^b$, $11^b$ and $12^b$. Tracks $1^a$ and $1^b$ are preferably of the same recording and form a pair of tracks alike except that the track $1^a$ runs in one direction while track $1^b$ extends in the opposite direction. In like manner the tracks bearing like numerals are alike and form pairs and are differentiated as to the direction in which they run, by the alphabetic exponents applied to the numerals.

In accordance with my invention adjacent tracks of each group are suitably separated by separating areas 13 so that one track does not become confused with another and further, the two groups a and b of tracks are separated by a control strip 14 which is preferably a blank portion of the web left free and unobstructed, except possibly that it is made opaque so that it presents a part of the web for cooperation with the stop means L, as will be hereinafter described.

It is to be understood that in carrying out my invention the tracks employed on the web may be of any suitable character. For example, I will refer to them as being of the light density type which is well known in the art.

The case E carrying web C, means D, means H, means G, means L, etc., is preferably a light-tight structure or housing and in the form of the invention illustrated it is a sectional housing involving a base section 15 and a top section 16 hinged together by a suitable hinge connection 17 and releasably held in closed position by a releasable latch 18. The base section of the case is shown as including a bottom 19, ends 20 and spaced parallel side walls 21. The top section 16 includes a top or face 22, ends 23 and spaced parallel side walls 24. The opposing edge portions of the case sections abut or fit tight together and the case sections themselves are preferably tight or free of apertures so that the case provides a light-tight structure in which the light elements of the apparatus are housed.

The means D carrying the web C involves, broadly, two spaced rotatable elements on parallel axes so that the said elements are opposite each other and carry the web so that it can be wound back and forth between said elements. In the form of the invention illustrated I provide like spools 25 and 26 opposite each other or in alignment and on spaced parallel axes transverse of the case E. The spools 25 and 26 are alike and each preferably includes a hub 27 of suitable size on which the web C is wound, and end flanges 28 at the ends of the hub maintaining the web in proper winding alignment on the hub.

The mounting that I have provided for each spool involves a shaft 30 rotatably supported in bearings 31 carried by the side walls of the case E. In the particular construction illustrated the flanges 28 of the hub are threaded onto the end portions of the shaft and are set in the desired position by lock nuts 32 threaded on the shaft. The projecting end portions of the shaft, that is the portions of the shaft beyond the flanges 28 enter and are rotatably supported in the bearings, the end 33 being extended to be engaged and driven through means F and the other end 34 being extended so that it is accessible to the exterior of the case to be engaged by a hand crank 35 or the like if it is desired to rotate the spool manually, as when a new web is being wound onto the spool. In accordance with my present invention the spools 25 and 26 are carried by the supporting shafts 30 so that they are in the end portions of the case E or are spaced somewhat apart in the case leaving a clear opening in the case between the spools to pass the light beams, as indicated in Fig. 3 of the drawings.

Figures 5, 6:
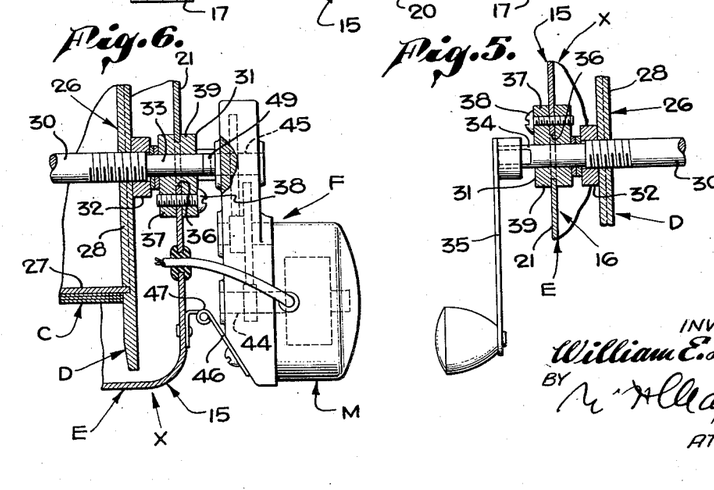
Fig. 5 is an enlarged detailed sectional view taken as indicated by line 5—5 on Fig. 4, showing a manual operating handle applied to the spool shaft.
Fig. 6 is an enlarged detailed sectional view taken on line 6—6 on Fig. 4, showing a motor and the drive provided therefrom to the spool operated by the motor.
Figure 7:
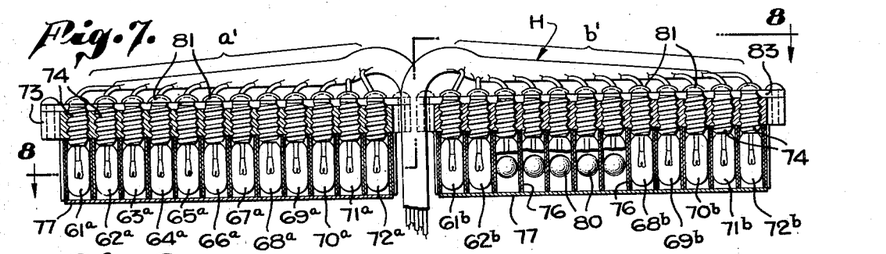
Fig. 7 is an enlarged detailed sectional view taken on line 7—7 on Fig. 3, showing parts of the means.
Figure 8:
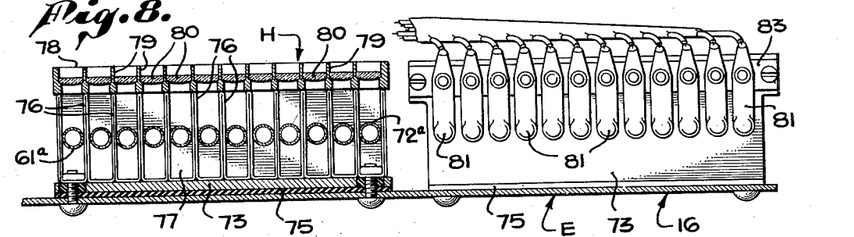
Fig. 8 is a detailed sectional view taken substantially as indicated by line 8—8 on Fig. 7.
Figure 9:
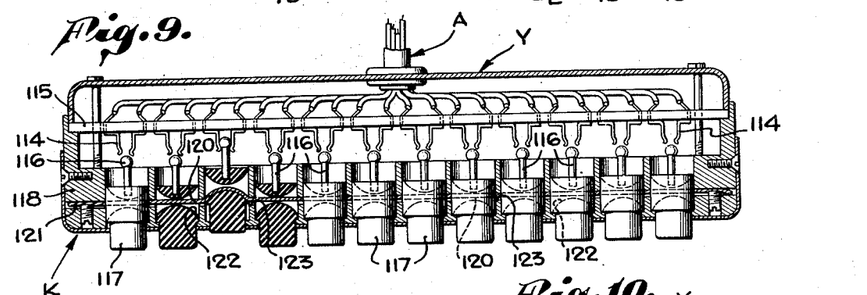
Fig. 9 is a detailed sectional view taken as indicated by line 9—9 on Fig. 2 showing the mechanism provided in the control unit.

In accordance with the preferred form of my invention I mount the spool carrying shafts permanently in the case so the spools always remain in position in the case in proper alignment with each other. To do this I construct the bearings 31 in the form of blocks seated in notches 36 provided in the sides 21 of the base portion 15 of the case from the forwardly facing edges thereof. The blocks have spaced ears 37 overlying the sides of the case or receiving the side parts between them and screws 38 or like fastening devices are employed to secure the ears to the sides of the case. I also prefer to provide guide ears 39 on the bearing blocks to guide the sides 24 of the top section 16 relative to the base section, as clearly shown in Figs. 5 and 6 of the drawings.

Figure 3:
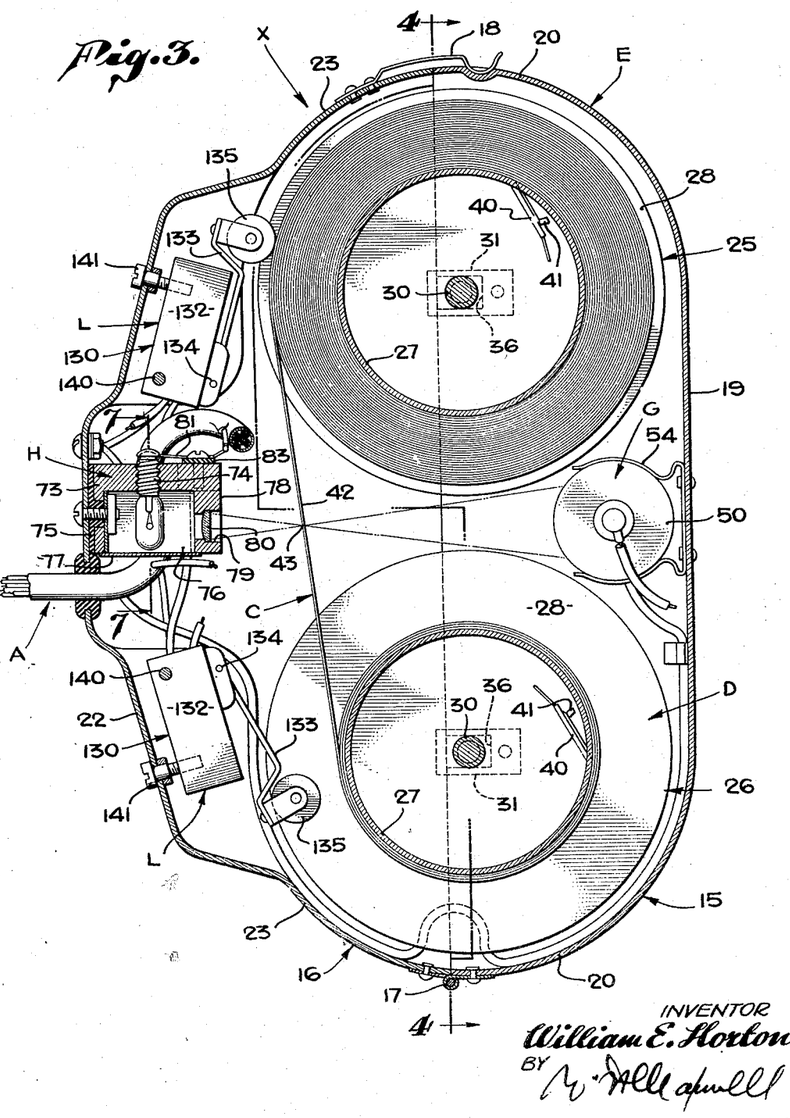
Fig. 3 is an enlarged detailed sectional view of the main unit which involves the record web handling means, the pick-up and the exciting means.

The web C has its ends applied to the spools and the ends of the web are preferably releasably connected to the spools as by hooks 40 such as are shown in Fig. 3 of the drawings. The hooks may be struck inwardly from the hubs 27 of the spools and are formed with web-holding points 41 faced in the desired direction. The web C is wound onto the spools so that it has a connecting portion 42 extending freely between the spools remote from the back 19 of the case, or between the faces of the spools toward the top 22 of the case section 16. The connecting portion 42 of the web C is an important feature of my construction since it is a simple, straight, or taut portion of the web unencumbered by light gates or other mechanical contraptions.

When the web C is carried by the spools so that it is almost all on one spool and has but a short portion on the other spool, the free connecting portion 42 of the web is angularly related to the plane in which the axes of the spools are disposed at a slight angle such as is shown in Fig. 3. As the film is wound from one spool to the other the slight angularity of web portion C varies or changes until it is reversed from that shown in Fig. 3 and in the course of such change in position of portion 42 there is a very slight and practically negligible shifting of the midpoint 43 of portion 42 relative to the plane in which the axes of the spools are located. In practice the variation of the plane of portion 42 from a plane parallel to that in which the axes of the spools lie is slight in either direction and the shifting of point 43 relative to the plane in which the spools lie is negligible.

Figure 1:
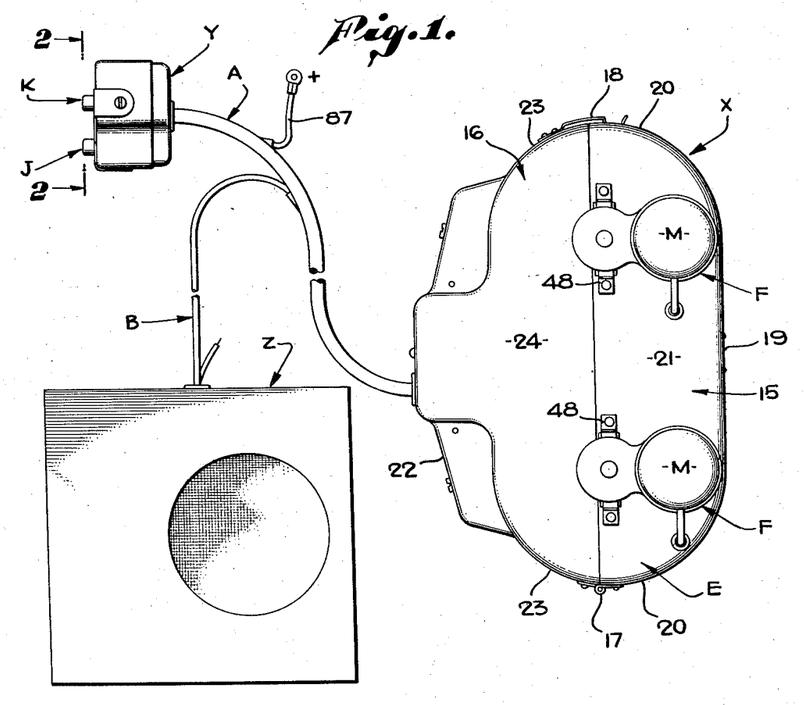
Fig. 1 is a view illustrating the several essential units involved in carrying out the present invention, showing the manner in which such units can be related so that the record handling means with the pick-up and exciting means are in one unit remote from the control and remote from the amplifier and speaker unit which may also be remote from the control part.
Figure 2:
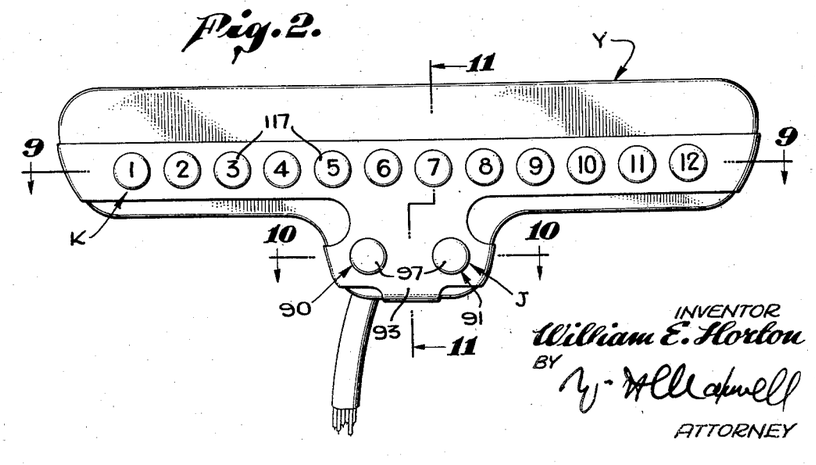
Fig. 2 is an enlarged view showing the face of the control unit being a view taken as indicated by line 2—2 on Fig. 1.

The drive means F that I provide for the web C or the web handling means D preferably involves two like but independently operating units each involving essentially a motor M driving one of the spools of means D. As shown in Figs. 1 and 4 of the drawings I provide a motor M for each spool at the exterior of case E. The motors are preferably alike and in the form of the invention illustrated in the drawings each motor M has its drive shaft 44 geared to a counter-shaft 45 adjacent and in alignment with the end 33 of the spool shaft 30. The motor is carried by a bracket 46 connected to case E through a suitable hinge connection 47 and is normally held with the countershaft in alignment with the spool shaft 30 through releasable latches 48. A releasable driving connection is established between the counter shaft 45 and spool shaft 30. For example I may provide a clutch 49 for establishing such connection. When the latches 48 are engaged holding the parts positioned as shown in the drawings the motor M has driving engagement with the shaft 30 either to drive the shaft or to be driven by the shaft. However, when the latches 48 are released the motor can be swung out disengaging the clutch 49 and allowing the shafts 30 and 45 to turn freely relative to each other.

The pick-up means G that I have provided is preferably a simple or conventional photo-electric cell and in accordance with my invention I provide a single pick-up or cell to cooperate with the several light beams directed to the cell by the various light sources of the exciting means H. In the form of the invention illustrated the pick-up or photo-electric cell G is carried in an elongate tube or envelope 50 in which the necessary pick-up elements are located the terminals for such elements being located at the ends of the envelopes, as shown in Fig. 4 of the drawings. The photo-electric cell is preferably mounted in a fixed position transversely at the back of the case E immediately inside the bottom 19 of section 15. It is to be understood, of course, that the envelope 50 of the photo-electric cell may be a transparency or glass in which case it is desirable to provide suitable masking as at 52, leaving only a window 53 at the forwardly facing side of the cell to admit light. It will be observed from the drawings that the cell G is made long enough to extend the entire width of the case or at least long enough to extend the width of the track bearing portions of the web C.

It is also to be observed that mounting clips 54 are provided on the back 19 to carry the photo-electric cell and are so located as to hold the cell midway between the spools with its window 53 facing the midpoint 43 of web portion 42.

The exciting means H serves to direct beams of light through the web C at the midpoint 43 to fall upon the pick-up G. In accordance with my invention the means H involves, generally, a plurality of individual light sources and corresponding light directing means or lenses, it being preferred to provide a light source with a directing lens for each sound track on web C. Since the sound tracks on the web C are grouped as for instance into groups $a$ and $b$ the light sources of means H are correspondingly grouped into corresponding groups $a'$ and $b'$.

The group $a'$ of the light sources of means H involves lamps, preferably incandescent lamps $61^a$ to $72^a$, inclusive corresponding or cooperatively related to sound tracks $1^a$ to $12^a$, respectively. The group $b'$ of the light sources of means H involves lamps, preferably incandescent lamps $61^b$ to $72^b$, inclusive corresponding or cooperatively related to sound tracks $1^b$ to $12^b$, respectively. The several lamps $61^a$ to $72^a$ are in a bank or line parallel with a transverse line across the web portion 42 through midpoint 43 and the spacing of the several lamps crosswise of web portion 42 preferably corresponds with that of the tracks $1^a$ to $12^a$, inclusive. It is to be understood that the lamps $61^b$ to $72^b$ are likewise in a bank related to sound tracks $1^b$ to $12^b$ in the manner described.

In accordance with the broader aspects of my invention I may mount the several lamps of each bank in any suitable manner. In the case illustrated I show the several lamps carried by a single contact or bus bar 73, the lamps having threaded bases 74 engaged in threaded openings in the bar 73. There is a separate bar 73 for each bank or series of lights and the bars are insulated from each other and from other parts of the structure by suitable insulation 75.

I prefer in practice to house each lamp of the means H as by partitions 76 between adjacent lamps, a shield 77 covering the lamps and a front wall 78 between the lamps and the web. There is a light aperture 79 in the front wall 78 opposite each lamp and I preferably support a suitable lens 80 in or at each aperture so that the light from each lamp is directed as a beam from the means H toward the cell G, the beam being a focussed beam having its focal point occurring at the midpoint 43 of web portion 42.

A feature of my invention is the mounting and construction of means H so that it is free of working parts such as mechanical devices which are delicate and expensive to manufacture and which are subject to failure or mal-adjustment. It is to be observed that with the construction that I have provided the various parts of the means H are mounted in a fixed position on the front 22 of case section 16 at the inner side of the front. In practice the only adjustment required or desirable is adjustment of the lamps which can be effected by readily rotating them in the threaded openings provided in the bus bar 73.

In accordance with the preferred form of my invention, as where the record web C carries bars or tracks which are grouped, the lamps of means H with their respective lenses are grouped corresponding to the grouping of the tracks as hereinabove described, and furthermore the lamps are connected in pairs corresponding to the pairs of tracks. As indicated in the diagram Fig. 14 tie lines 61 to 72, inclusive, connect lamps $61^a$ to $72^a$ with lamps $61^b$ to $72^b$, respectively. The ends of the tie lines are maintained in contact with bases of the individual bulbs through spring contacts 81 supported from the bus bars 73 through insulation 83 and having pressure engagement with the ends of the bulbs to not only make electrical contact with the bulbs but to also hold them against accidental movement or shifting due to vibration, or the like.

The group selecting and starting means J is a switch mechanism involving two like mechanically interconnected switches only one of which can be closed at a time. In the preferred electrical circuit there is a source of electrical energy 85, one pole of which is grounded as at 86 while the other is carried by what I will term a main line 87. The main line 87 is divided into two branch lines 88 and 89 which extend to the bus bars 73 of the two banks of lamps of means H. The two switches of means J are connected in the branches of the main line preferably as they issue from the main line 87, so that switch 90 of means J controls branch line 89. Since only one of the switches of means J can be closed at any one time the means J provides a control whereby only one bank of lights is available for use at any one time.

In the form of construction illustrated the means J involves a case 93 carrying switches 90 and 91 and the two switches are of like construction, each involving spaced contact arms 94 carried by a plate 95 of insulation and a bridging contact 96 carried by a push button 97. When the push button is in, the bridging contact is engaged and held between contacts 94, closing the circuits through the branch line controlled by the switch. In the construction illustrated the button 97 is slidably carried in a guideway 98 provided in the body 93.

Figure 10:
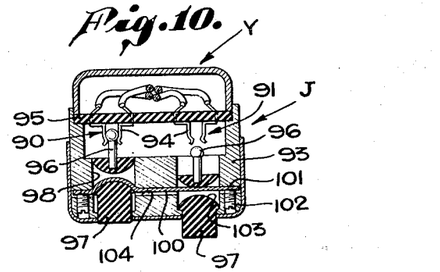
Fig. 10 is a detailed sectional view taken as indicated by line 10—10 on Fig. 2.
Figure 11:
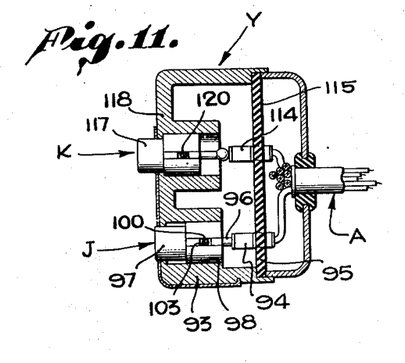
Fig. 11 is a transverse sectional view taken as indicated by line 11—11 on Fig. 2.

In accordance with my construction the two switches 90 and 91 which are alike are mounted side by side in the body with the button 97 accessible to the exterior of the body. When a button is depressed it is substantially flush with the body, whereas when it is unactuated it projects from the body as clearly shown in Fig. 10. The means that I provide to interconnect the switches so that only one can be closed at a time, preferably includes a flexible tie member 100 extending between the switches. The tie member may be a suitable cord or the like having its ends fixed to the body 93 as at 101 where they may be held by clamp screws 102 or the like. The intermediate portion of the tie member is threaded through openings 103 in the buttons 97 and an opening 104 in the body. The tie member is made of such length as to provide only enough slack to permit one button 97 to be depressed at a time as will be apparent from an examination of Fig. 10 of the drawings. Through this construction when one button is depressed the other button is simultaneously moved out opening the switch with which it is related.

The individual selector means K provided by my invention is concerned with the selection of the desired lamp to be energized at any particular time and it is through this means that the operator is enabled to select which sound track is to be operated. Being concerned with the selection of a lamp the means K is included in the electrical circuit not in the branch main lines 88 and 89 above described, but rather in the sides of the lamp circuit which preferably connect to ground as at 110. In accordance with the preferred form of my invention the means K is a switch means or switch mechanism involving as many switches as there are lamps of means H as are available for use. For instance, where there are twelve sound tracks and twelve corresponding lamps, available at any one time, from which one may be selected, I provide twelve switches in the means K designated at 61ᶜ to 72ᶜ, inclusive. The switches 61ᶜ to 72ᶜ are connected between tie lines 61 and 72, respectively, and a common grounded bus bar 112, the bus bar being grounded through a ground connection 110.

A feature of the means K is the provision in this means whereby but one of the switches of the said means may be closed at any one time. Consequently only one of the tie lines 61 to 72, inclusive, can be connected to ground at any one time, and the particular tie line connected to ground will depend upon which switch of means K is closed.

In carrying out my invention I prefer to employ a switch construction in the means K similar to that employed in means J, in which case each switch involves spaced contacts 114 carried by an insulating plate 115 and a bridging contact 116 carried by a push button 117, the push button being slidably carried in an opening provided in the body 118 which may, in practice, be an integral continuation of body 93 of means J. The interconnecting means provided in means K preferably involves a flexible tie member 120 similar to the tie member 100 hereinabove described and having its ends fixed or anchored as at 121 and being threaded through openings 122 in the push buttons and openings 123 in the body. The tie member 120 is proportioned so that it has only enough slack between its fixed ends to allow one push button to be depressed at a time and since it is a flexible tie member when one push button is depressed the previously depressed push button is moved out to the unactuated position.

The stop means L included in my construction is a switch means involving two switches 130 one controlling each branch line from the power source 85. The switches 130 are connected in the branch lines 88 and 89 in series with the switches 90 and 91, respectively, of means J with the result that a lamp of a selected bank of lamps in means H can only operate when the switch 130 controlling that bank is closed. The switches 130 being stop switches are normally closed and are only opened when it is desired that the apparatus should stop. In accordance with my invention the switches 130 are under control of the web C and are related to the web so that the switch 130 closed as the web is being wound onto one spool opens when a predetermined amount of web has wound onto that spool. At any time when less than the said predetermined amount of web is on a spool the switch in connection with that spool is closed.

In the preferred arrangement illustrated in the drawings the switches 130 are conventional quick-acting or snap switches carried in suitable cases 132. Each switch has an operating lever 133 pivoted at 134 and carrying a web contacting roller 135 located to be engaged by the control strip 14 of the web C when a predetermined portion of the web has wound onto the spool opposite the switch. I provide for suitable adjustment of the mechanism just described by mounting the switch case 132 on a pivot pin 140 and providing an adjusting screw 141 which normally holds the switch in position but is operable to vary the spacing of the switch relative to the spool opposite which the switch is located. It will be apparent from Fig. 3 of the drawings that the two switches 130 of means L may be alike and it will be apparent how one of these switches is open each time the web C becomes fully wound onto one of the spools.

Figures 12, 13, 14:
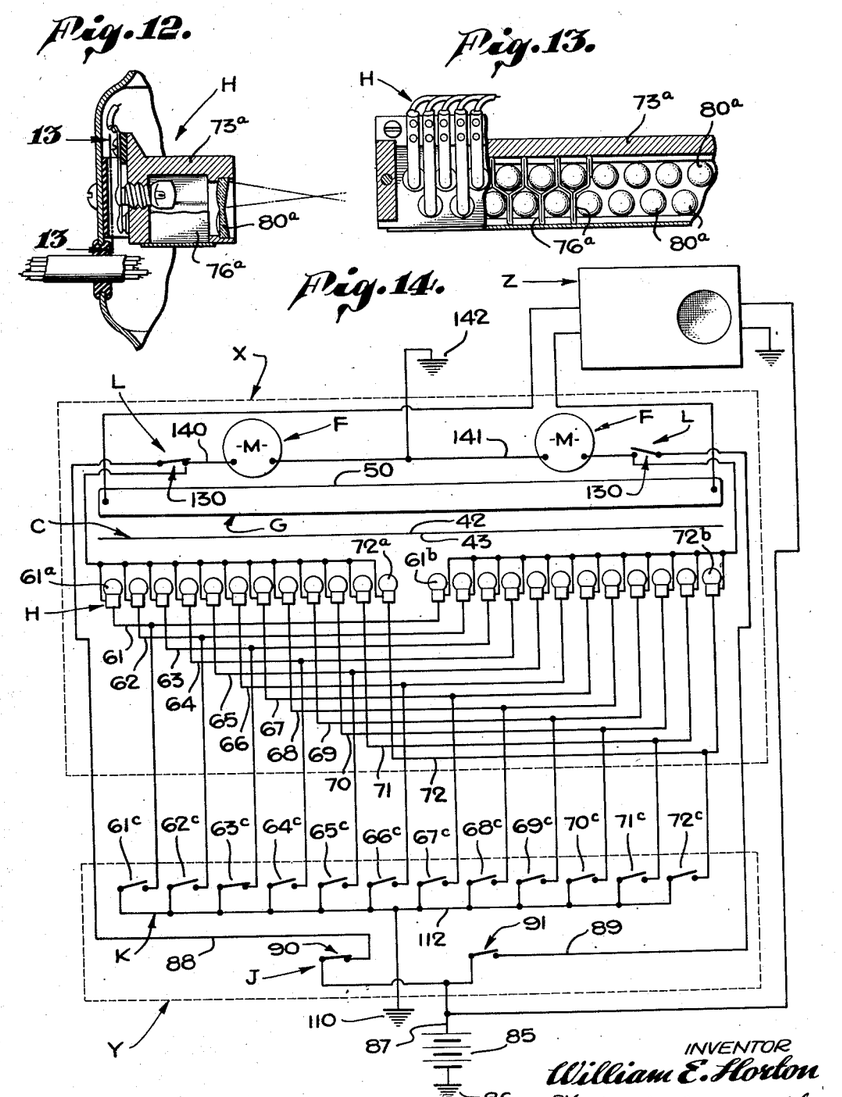
Fig. 12 is a view similar to a portion of Fig. 3, showing a modified form of construction that may be employed in the exciting means.
Fig. 13 is a view taken as indicated by line 13—13 on Fig. 12
Fig. 14 is a diagrammatic view illustrating the general cooperative relationship of the essential elements and the electrical circuit involved in the apparatus.

From the foregoing description I have described the various mechanical elements essential to my construction and also the various electrical elements and the controlling electrical connections. It is desirable in practice that the motors M be connected in the control system that I provide so that the proper motor is energized as the proper or desired lamp is energized to the end that when a lamp of one of the banks is energized the web is advanced from one spool to the other in the direction causing proper playing of the sound track through which the beam from that light is cast. In the drawings I have shown the motors M connected in extensions 140 and 141 of the line branches 88 and 89 which extensions are connected to ground as at 142. Through this arrangement, which is clearly illustrated in Fig. 14, the motors and the lamps are under control of the means J as well as the stop means L. When one of the switches of means J is closed, as shown in Fig. 14, a bank of lamps is selected and the apparatus started, the lamp circuit being closed through the lamp of the bank made available through the one closed switch of means K.

When operation is thus started one of the switches of means L is necessarily open by reason of one of the spools of means D being full of the web, the other spool having only the starting end of the web wound thereon. As the device operates resulting from the initial operation or starting effected through means J the web winds from the full spool onto the empty spool until the empty spool becomes the full spool and when it does become full the switch of means L opposite it is opened stopping the entire apparatus. For further operation of the apparatus the other switch of means J must be operated and when it is so operated the entire operation is reversed, that is the web is wound back onto the initial spool. Since the recordings of the two banks are in pairs a different recording will be heard only when the selector switch is operated changing from one selection to another.

It is to be observed that as the web is wound from one spool onto the other by reason of energization of one motor the other motor which is not energized is connected with the spool from which the web is being drawn and in being so connected affords a suitable drag establishing desired tension causing the web to wind firmly onto the spool onto which it is being wound and causing the connecting portion 42 of the web to be maintained taut between the two spools. The only time that the apparatus may remain energized after full operation, as above described, is when the case E is opened and both switches 130 are closed at the same time. Ordinarily the only time that the case E will be opened will be when the web is being changed and therefore there is nothing objectionable about one of the motors running as the web is being changed since both motors may at will be disengaged through the clutch means 45 hereinabove described.

In the form of the invention thus far described the lamps in each bank of means H are in a single line transversely of the mechanism or case, the spacing being such as to correspond to the spacing between sound tracks on the strip C. If the sound tracks are close together on the track C I may wish to stagger the lamps of means H as shown in Figs. 12 and 13 where the several lamps are shown carried by a bus bar 73a, not in a straight line but in staggered relation, in which case the partitions 76a are shaped to accommodate the staggered relationship and the lenses 80a are correspondingly modified or shaped to direct light from the lamps to the web in the desired manner. It will be apparent that the arrangement shown in Figs. 12 and 13 is somewhat more complex than that shown in the other figures of the drawings, but that it is also considerably more compact than that first described.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A sound reproducer of the character described including, a case, a single pick-up unit in the case, exciting means for said unit directing a plurality of spaced parallel beams of light to the unit each of which has a focal point between the unit and said means, means controlling said means to cast but one beam at a time, a pair of spaced spools mounted in the case, and a web carrying a plurality of sound tracks and wound on the spools with a straight connecting portion wholly unsupported between the spools with a point maintained in substantial register with said focal point of the light beam as the web is wound back and forth between the spools, each beam being directed to fall upon a sound track.

2. A sound reproducer of the character described including, a case, spaced spools in the case, a web carried by the spools and having a straight connecting part taut between the spools, the web having a plurality of sound tracks side by side and extending longitudinally of the web, a single pick-up cell fixed in the case at one side of the said web part and extending transversely thereof, and exciting means including a plurality of lamps in a fixed series extending transversely at the other side of said web part and a stationary lens for each lamp directing light through the said web part to the cell.

3. A sound reproducer of the character described including, a case, spaced spools in the case, a web carried by the spools and having a straight connecting part taut between the spools, the web having a plurality of sound tracks side by side and extending longitudinally of the web, a single stationary pick-up cell fixed in the case at one side of said web part and extending transversely thereof, exciting means fixed in the case and including a plurality of stationary lamps in a series extending transversely at the other side of said web part and a stationary lens for each lamp directing light through the said web part to the cell, and control means whereby the lamps are energized one at a time.

4. A sound reproducer of the character described including, a case, spaced spools in the case, a web carried by the spools and having a straight connecting part taut between the spools, the web having a plurality of sound tracks side by side and extending longitudinally of the web and divided into two groups, drive means for the spools including a motor for each spool, a single pick-up cell fixed in the case at one side of the said web part and extending transversely thereof, exciting means fixed in the case and including a plurality of lamps in two series extending transversely at the other side of said web part and a lens for each lamp directing light through the said web part to the cell, and control means including a group selector establishing one group or the other of lamps for operation, a lamp selector selecting one lamp of the selected group for operation, and a motor control coupled with the lamp groups so one motor operates when one lamp group is selected while the other motor operates when the other lamp group is selected.

5. A sound reproducer of the character described including, a case, spaced spools in the case, a web carried by the spools and having a connecting part taut between the spools, the web having a plurality of sound tracks side by side and extending longitudinally of the web and divided into two groups, drive means for the spools including a motor for each spool, a single pick-up cell fixed in the case at one side of the said web part and extending transversely thereof, exciting means fixed in the case and including a plurality of lamps in two series extending transversely at the other side of said web part and a lens for each lamp directing light through the said web part to the cell, and control means including a group selector switch establishing one group or the other of lamps for operation, a lamp selector switch selecting one lamp of the selected group for operation, and a motor control coupled with the lamp groups so one motor operates when one lamp group is selected while the other motor operates when the other lamp group is selected.

6. A sound reproducer of the character described including, a case, a pick-up unit in the case, exciting means for said unit directing a beam of light to the unit which beam has a focal point between the unit and said means, a pair of spaced spools mounted in the case, a web carrying a sound track and wound on the spools with a connecting portion between the spools with a point maintained in substantial register with said focal point of the light beam as the web is wound back and forth between the spools, and drive means for the spools including a separate motor driving each spool, and a motor energizing circuit by which the motors are energized only one at a time.

7. A sound reproducer of the character described including, a case, a pick-up unit in the case, exciting means for said unit directing a beam of light to the unit which beam has a focal point between the unit and said means, a pair of spaced spools mounted in the case, a web carrying a sound track and wound on the spools with a connecting portion between the spools with a point maintained in substantial register with said focal point of the light beam as the web is wound back and forth between the spools, and drive means for the spools including a separate motor for each spool, a releasable clutch between each motor and the spool driven thereby, and an energizing circuit for the motors by which they are alternately energized one at a time so one drags as the other is energized.

8. A sound reproducer of the character described including, a case, a pick-up unit in the case, exciting means for said unit directing a beam of light to the unit which beam has a focal point between the unit and said means, a pair of spaced spools mounted in the case, a web carrying a sound track and wound on the spools with a connecting portion between the spools with a point maintained in substantial register with said focal point of the light beam as the web is wound back and forth between the spools, a supporting shaft for each spool, a manual operating member engageable with each shaft, a separate drive for each shaft including a separate motor, and a releasable clutch connecting the shaft and motor, and an energizing circuit for the motors that drive the shafts by which the motors are energized one at a time so one drags when the other is energized.

9. Apparatus of the character described including an exciter involving a plurality of lamps, an energizing circuit for the lamps, and a selector for the lamps including, switches in said circuit, one for each lamp, and a control element engaged with each of the switches and operated by any one of the switches when it is closed to a position where it establishes all of the other switches in open position.

10. Apparatus of the character described including, a web record, a drive motor operating a portion of the record lengthwise, a pick-up cell at one side of the said portion of the record, an exciter for the cell at the other side of the record including, a plurality of spaced lamps, an electric circuit energizing the motor and lamps, a switch in said circuit controlling the motor and lamps, individual selector switches in the circuit, one for each lamp, and a control element engaging each of the selector switches and operated by any one of the selector switches when it is closed to open any other selector switch which may be closed.

11. Apparatus of the character described including, a web record, a drive motor operating a portion of the record lengthwise, a pick-up cell at one side of the said portion of the record, an exciter for the cell at the other side of the record including, a plurality of spaced lamps, an electric circuit energizing the motor and lamps, a starter switch controlling energization of said circuit, a stop switch in the circuit, selector switches in the circuit, one for each lamp, and a control element engaging each of the selector switches and operated by any one of the selector switches when it is closed to open any other selector switch which may be closed.

12. Apparatus of the character described including, a web record, a drive motor operating a portion of the record lengthwise, a single pick-up cell at one side of the said portion of the record, an exciter for the cell at the other side of the record including, a plurality of spaced lamps, an energizing circuit for the motor and lamps, a starter switch in said circuit controlling energization thereof and a stop switch in the circuit, a control member controlling the stop switch and operated by the record, selector switches in the circuit, one for each lamp, and a control element engaging each of the selector switches and operated by any one of the selector switches when it is closed to open any other selector switch which may be closed.

13. Apparatus of the character described including, a web record, a drive motor operating a portion of the record lengthwise, a pick-up cell at one side of the said portion of the record, an exciter for the cell at the other side of the record including, a plurality of spaced lamps, an electric circuit energizing the motor and lamps, a starter switch in said circuit controlling the motor and lamps, a stop switch in the circuit, selector switches in the circuit, one for each lamp, and a control element engaging each of the selector switches and operated by any one of the selector switches when it is closed to open any other selector switch which may be closed, the circuit including a lead to the motor and lamps and the starter and stop switches being in series in said lead.

14. Apparatus of the character described including, a web record, a drive motor operating a portion of the record lengthwise, a pick-up cell at one side of the said portion of the record, an exciter for the cell at the other side of the record including, a plurality of spaced lamps, an electric circuit energizing the motor and lamps, a switch in said circuit controlling the motor and lamps, selector switches in the circuit, one for each lamp, and a control element engaging each of the selector switches and operated by any one of the selector switches when it is closed to open any other selector switch which may be closed, the motor and lamps being connected in parallel in said circuit.

15. Apparatus of the character described including, a multiple track web record carried on two spools and having the tracks in two groups, a drive motor for each spool, a pick-up cell, an exciter for the cell including a plurality of spaced lamps, one for each track of the record, the lamps being divided into two banks, an energizing circuit including two branches one supplying each bank and one motor, group selector means including group selector switches in the two branches of the circuit connected so only one can close at a time, and selector means for the individual lamps whereby they are connected in the circuit to be on only one at a time.

16. Apparatus of the character described including, a multiple track web record carried on two spools and having the tracks in two groups, a drive motor for each spool, a pick-up cell, an exciter for the cell including a plurality of lamps, one for each track of the record, the lamps being divided into two banks, an energizing circuit including two branches one supplying each bank and one motor, group selector means including group selector switches in the two branches of the circuit connected so only one can close at a time, stop switches in the said branches, and selector means one for each of the lamps whereby the lamps are connected in the circuit to be on only one at a time.

17. Apparatus of the character described including, a multiple track web record carried on two spools and having the tracks in groups, a drive motor for each spool, a pick-up cell, an exciter for the cell including a plurality of lamps, one for each track of the record, the lamps being divided into two banks, an energizing circuit including two branches one supplying each bank and one motor, group selector means including group selector switches in the two branches of the circuit connected so only one can close at a time, record controlled stop switches in the said branches in series with the group selector switches, and selector means one for each of the lamps whereby the lamps are connected in the circuit to be on only one at a time.

18. Apparatus of the character described including, a multiple track web record carried on two spaced spools and having the tracks in two groups, a drive motor for each spool, a pick-up cell intermediate the spools, an exciter for the cell including a plurality of lamps, one for each track of the record, the lamps being divided into two banks, an energizing circuit including two branches one supplying each bank and one motor, tie connections connecting lamps of the two groups into pairs, and a ground connection from each tie connection, group selector means including group selector switches in said branches connected for operation one at a time, and lamp selecting means including switches one in each ground connection and connected for operation only one at a time.

19. Apparatus of the character described including, a multiple track web record carried on two spaced spools and having the tracks in two groups, a drive motor for each spool, a pick-up cell intermediate the spools, an exciter for the cell including a plurality of lamps, one for each track of the record, the lamps being divided into two banks, an energizing circuit including two branches one supplying each bank and one motor, tie connections connecting lamps of the two groups into pairs, and a ground connection from each tie connection, group selector means including group selector switches in said branches connected for operation one at a time, record controlled stop switches in the said branches in series with the group selector switches, and lamp selecting means including switches one in each ground connection and connected for operation to be on only one at a time.

20. A sound reproducer of the character described including, a case, spaced spools in the case, a web carried by the spools and having a straight connecting part taut between the spools, the web having a plurality of sound tracks side by side and extending longitudinally of the web, a single pick-up cell in the case intermediate the spools and at one side of the said web part and extending transversely thereof, and exciting means including a plurality of lamps in a straight series extending transversely at the other side of said web part and a lens for each lamp directing light through the said web part to the cell.

21. A sound reproducer of the character described including, a case, spaced spools in the case, a web carried by the spools and having a straight connecting part taut between the spools, the web having a plurality of sound tracks side by side and extending longitudinally of the web, a single pick-up cell in the case intermediate the spools at one side of the said web part and extending transversely thereof, and exciting means including a plurality of lamps in a series in staggered relation extending transversely at the other side of said web part and a lens for each lamp directing light through the said web part to the cell.

WILLIAM E. HORTON.

REFERENCES CITED

The following references are of record in the file of this patent:

UNITED STATES PATENTS

| Number | Name | Date |
| --- | --- | --- |
| 1,695,857 | Proctor | Dec. 18, 1928 |
| 1,789,607 | Steurer | Jan. 20, 1931 |
| 1,791,039 | Owens | Feb. 3, 1931 |
| 1,855,933 | Alden | Apr. 26, 1932 |
| 1,927,260 | Erbe | Sept. 19, 1933 |
| 1,951,931 | Henderson | Mar. 20, 1934 |
| 2,002,352 | Owens | May 21, 1935 |
| 2,069,595 | Thomas | Feb. 2, 1937 |
| 2,091,688 | Owens | Aug. 31, 1937 |
| 2,109,627 | Finch | Mar. 1, 1938 |
| 2,142,391 | Fuschi | Jan. 3, 1939 |
| 2,157,824 | Iams | May 9, 1939 |
| 2,196,730 | Hooker | Apr. 9, 1940 |
| 2,215,468 | Herzig | Sept. 24, 1940 |
| 2,225,323 | Severy | Dec. 17, 1940 |
| 2,242,548 | Regan | May 20, 1941 |
| 2,260,202 | Wente | Oct. 21, 1941 |
| 2,384,621 | Isaac | Sept. 11, 1945 |
| 2,428,778 | Bolsey | Oct. 14, 1947 |

FOREIGN PATENTS

| Number | Country | Date |
| --- | --- | --- |
| 701,552 | Germany | Jan. 18, 1941 |